July 17, 1962    J. P. KEATING ET AL    3,044,539
PROCESS OF COMBUSTION
Original Filed Dec. 11, 1958    2 Sheets-Sheet 1
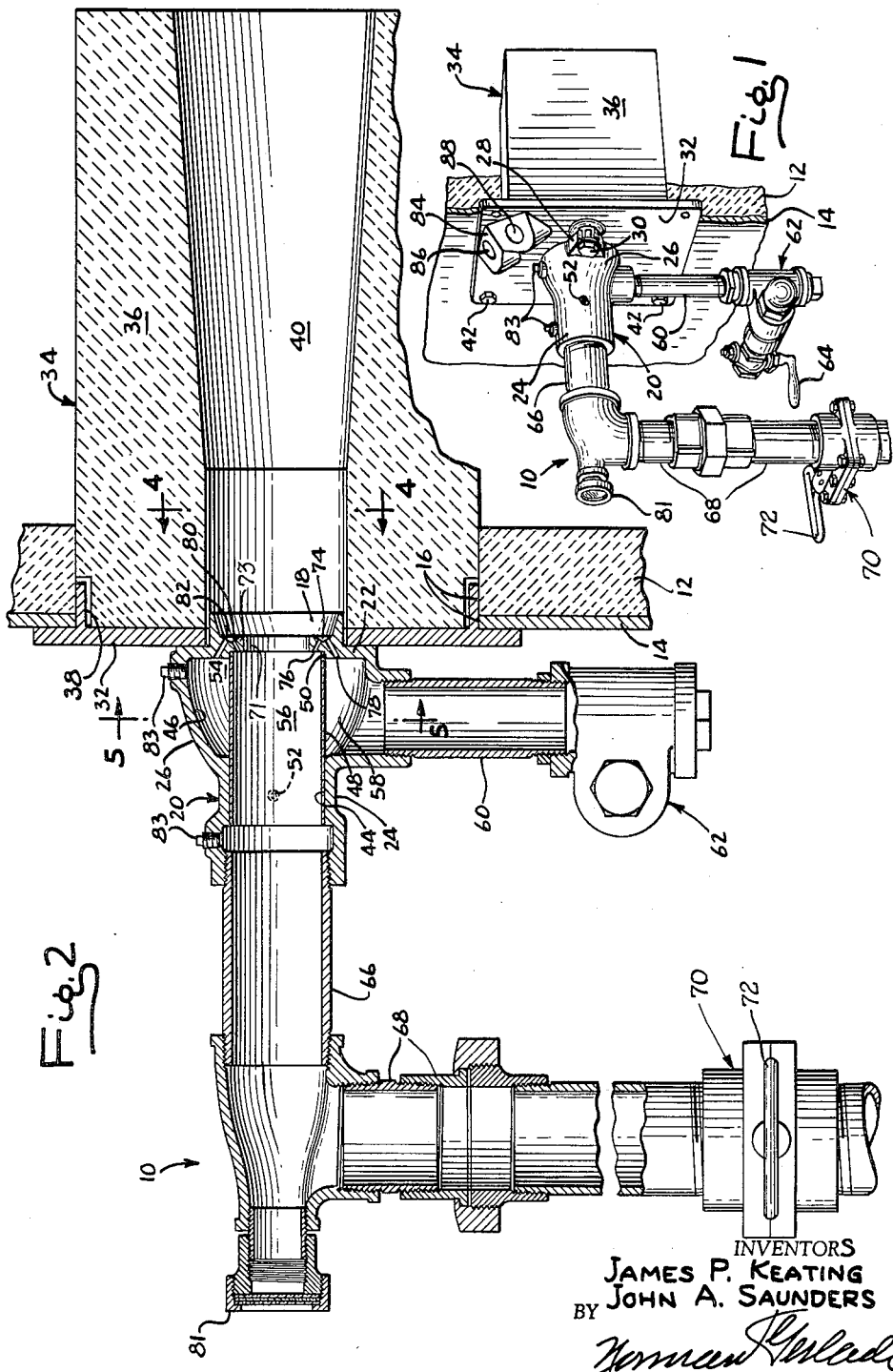
INVENTORS
JAMES P. KEATING
JOHN A. SAUNDERS
BY
ATTY.

July 17, 1962 J. P. KEATING ET AL 3,044,539
PROCESS OF COMBUSTION
Original Filed Dec. 11, 1958 2 Sheets-Sheet 2
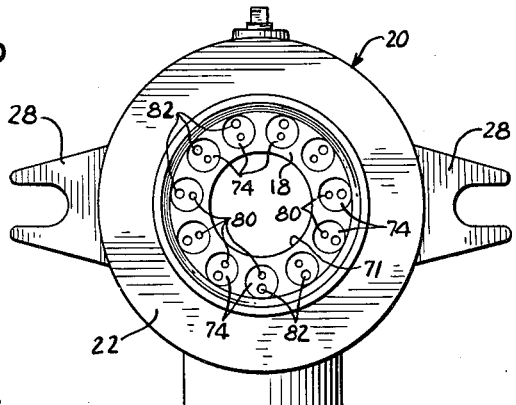
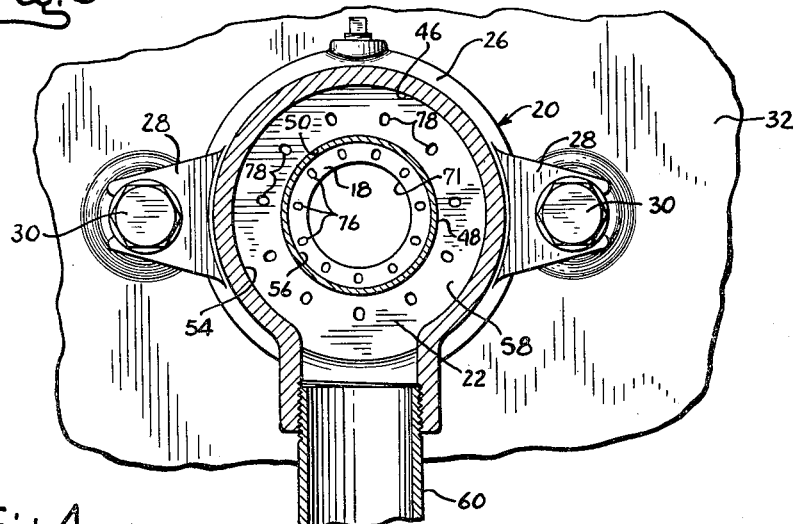
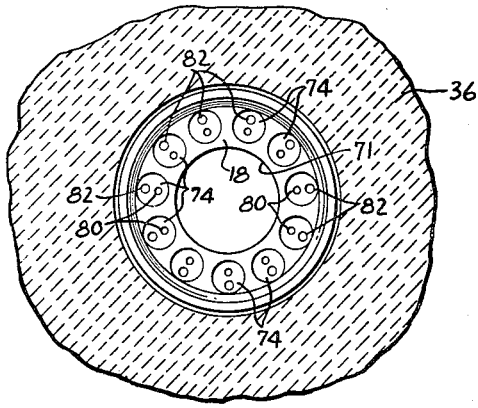
INVENTORS
JAMES P. KEATING
JOHN A. SAUNDERS
BY
Urman F Gerlach
ATTY.

3,044,539
PROCESS OF COMBUSTION
James P. Keating and John A. Saunders, Rockford, Ill., assignors to Eclipse Fuel Engineering Co., Rockford, Ill., a corporation of Illinois
Original application Dec. 11, 1958, Ser. No. 779,658. Divided and this application Sept. 8, 1959, Ser. No. 838,527
1 Claim. (Cl. 158—117.5)

The present invention relates to a process of combustion, as characterized by a novel form of burner apparatus whereby such process may be carried out, such apparatus forming the subject of our co-pending application Serial No. 779,658, filed on December 11, 1958, of which application the present application is a true division. The invention is specifically concerned with a combustion process wherein the products of combustion are gases, for example, fuel gas and air, and which may be conducted at stoichiometric gas-air ratios wherein complete combustion takes place so that both gaseous constituents are completely consumed, or which, alternatively, may be conducted at a disproportionate gas-air ratio wherein there is an excess of air. Stated in terms of the apparatus by means of which such a process may be carried out, the burner may be operated as a nozzle mixing burner having control devices for maintaining a constant gas-air ratio for stoichiometric operation, or it may be operated so that the burner is supplied with a constant unvarying volume of air while the volume of gas is varied throughout a wide range of gas-air ratios to produce numerous operational advantages which will be outlined presently.

The provision of a process such as has briefly been outlined above is one of the principal objects of the present invention and one of the means whereby this object is attained resides in the creation of a multiplicity of small jets of air at localized regions in the vicinity of a relatively large jet of air under such circumstances that the large jet of air may entrain by an injection action the small jets of air; feeding each of the small jets of air at the respective localized regions with gaseous fuel by creating a companion fuel jet for each of the localized air jets while maintaining combustion at said localized regions; and varying the rate at which the gaseous fuel is fed to each localized region. The process briefly set forth above may be practiced under a wide variety of conditions wherein the velocity of the multiple small air jets and the velocity of the single large air jet are varied but, principally, it is contemplated that constant air velocities be maintained for a given range of furnace operation and that the velocity selected result in a relatively large volume of air at the large air jet and that the volume of air supplied to each of the small air jets be approximately equal to that required to support combustion at the respective localized region when minimum gaseous fuel is supplied to such region. By thus maintaining a relatively large volume of air at the large air jet and varying only the rate at which gaseous fuel is supplied to the various localized regions, uniform furnace circulation is maintained while the temperature of the circulating air may be controlled merely by changing the gas volume.

Because of the maintenance of a relatively large volume of air flow, complete combustion of the gaseous fuel will take place regardless of the rate at which the gaseous fuel is fed to the various localized regions. At low gas velocity, the relatively small air jets supply the necessary oxygen for combustion of most, if not all, of the gas which is supplied to the various localized regions. In other words, if the quantity of gaseous fuel being fed to a given localized region is small, the air which is supplied to such region may be just sufficient to consume the gas or it may be in slight excess thereof so that, in either event, no appreciable amount of unburned fuel gas is drawn into the main air stream of the large air jet. In such an instance, no appreciable heating effect will be attained, and where the condition exists in connection with a state of high residual furnace heat, a positive cooling effect will obtain although a low flame will be maintained at each localized region. As the proportion of fuel gas fed to the various localized regions is increased, excess fuel gas is drawn or "spilled," so to speak, into the main air stream of the large air jet and combustion takes place with high turbulence. A flame is thus created within the main air stream and the length and intensity of this flame is a function solely of the rate of flow of fuel gas to the various localized regions. The temperature of the circulating air which, according to the present process, remains constant in volume, may be varied between a condition of high heat and a condition of practically no heat merely by varying the gas volume between maximum and minimum rated capacities for any given installation.

An additional feature of the present process resides in the use of a multiplicity of fuel gas jets which are maintained at respective localized regions in an oxidizing atmosphere adjacent to but not directly in the path of a high velocity large volume jet of air, and which gas jets, in their own respective enviroments of the localized region, operate independently of and without interference from any of the other fuel jets. Sufficient air is supplied to each gas jet at all times to maintain combustion at its respective localized region, and by varying the volume of fuel gas fed to the various localized regions, combustion may be restricted solely to the localized regions, or it may be extended therefrom to various regions of the high velocity air stream, even to the point were stoichiometric gas-air ratios obtain within the high velocity air stream and substantially complete combustion takes place within that stream so that all of the available air is entirely consumed. By controlling not only the amount of combustion by also controlling the location of combustion inception, many advantages are attained which will become clear presently, but principal among which are the more accurate and efficient application of heat and the fact that certain parts of the burner construction by means of which the process is carried out need not be made of heat-resistant material.

The process outlined above will find many practical applications particularly where oxidizing conditions are desirable and burners constructed in accordance with the principles of the present invention for carrying out the process may, with or without modification, as desired, be employed in connection with brick kilns, and in general purpose, furnaces for heat treating, hardening, annealing, stress-relieving, drawing, or slow cooling purposes, as well as for air heating or other heat transfer operations. Irrespective, however, of the particular use to which the present process may be put, the essential features of the invention are at all times preserved.

Briefly, in carrying out the process of the present invention with maximum efficiency, the invention contemplates the use of a burner construction of extremely simple design having gas and air orifices which will produce the above-mentioned large volume, high velocity air jet, as well as the localized combustion regions in the vicinity of such air to which both air and gas in small quantities are fed for localized combustion, with means being provided for varying the supply of gas to such localized regions so that when gas in excess of that required to attain approximate stoichiometric conditions at the localized regions is fed thereto, the excess fuel at each region is drawn by an injector action, into the main or large volume of air issuing from the large air jet and combustion caused to take place within the large air jet with the length and intensity of the resultant flame being a function of the volume of gas entering the burner.

Insofar as the burner construction for practicing the present invention is concerned, it is necessary to provide a burner wherein the aforementioned localized combustion regions are adequately shielded or isolated from the large volume of relatively high velocity air passing through the burner so that regardless of the air pressure maintained for feeding the high velocity air through the burner, the flame maintained at the various localized regions cannot and will not be blown out or otherwise extinguished. For the most effective results in practicing the present process, it is contemplated that a ring-type burner be employed having a relatively large central opening therethrough with provision being made for feeding a relatively large volume of air to the central opening for passage therethrough. Circumferentially spaced around the burner ring, preferably at equally spaced regions, are a series of shallow depressions or pockets, each of which communicates through two relatively small orifices with the source of air and with the source of gas, respectively. Each pocket is disposed, therefore, in close proximity to the base of the large volume air jet issuing from the central ring opening so that the localized flame resulting from ignition of the gaseous constituents i.e., air and gas, issuing from the two orifices constitutes in one sense a pilot flame for the large volume of combustion air issuing from the central ring opening. The various pilot flames which thus surround the central opening will, at low or minimum gas pressure, have nothing to yield to the larger high velocity stream of air which, by its injector action, "pulls," so to speak, at the numerous pilot flames. Since at such low pressure stoichiometric gas-air ratios, or nearly so, obtain within each ring pocket, combustion within the pocket is complete and the injector action of the larger air stream can pull from the various pockets nothing but completely spent products of combustion. The larger air stream passing through the burner is, therefore, unaffected except for the admixture therewith of negligible amount of spent combustion products which do not even appreciably raise the overall temperature of the air. If from a previous run or operation, the furnace is hot, this unaffected and unheated air will continue to pass through the burner to exert a cooling effect on the combustion block and furnace walls or upon any work which is undergoing treatment within the furnace. In order to raise furnace temperatures, it is merely necessary to manipulate the gas admission valve leading to the burner so that additional quantities of gas over and above those required to maintain stoichiometric conditions in each burner ring pocket are supplied to the various pockets. Under such conditions, the limited amount of air flowing to each pocket will be insufficient for complete combustion of all of the gas flowing to the pocket with the result that the injector action of the large air stream issuing from the central ring opening will draw from each pocket a quantity of fresh, unburned gas equal to the full amount of gas fed to the pocket, less the small quantity of gas which is consumed within the pocket by the available air fed thereto. This fresh, unburned gas is, therefore, available for combustion within the combustion block cone leading from the burner, or for combustion within the furnace itself, and combustion thereof takes place in any event under the influence of the initial pilot action of the small localized flames issuing from the various burner ring pockets. Obviously, the intensity of the flame, its length and other characteristics thereof are direct functions of the quantity of excess gas which cannot be consumed within the various localized pockets. It is contemplated that ranging from minimum fuel flow up to almost maximum fuel flow, the amount of excess fuel "spilling," so to speak, from the various burner ring pockets shall be exceeded by the quantity of air issuing from the central burner ring opening. It is further contemplated that at maximum fuel flow, the excess gas issuing from all of the burner ring pockets combined, shall be sufficient to give overall stoichiometric operation to the burner as a whole, which is to say, in other words, that complete combustion of all the available air and fuel passing through the burner will take place.

The above considerations are predicated upon a constant rate of flow of air to and from the burner and it will be obvious that if air pressure is reduced, stoichiometric operation of the burner may take place at something less than full gas pressure. Operation of the burner in this manner to effect different furnace temperatures places the burner in the class of nozzle mixing burners. Operation of the burner as otherwise previously described gives a type of operation which results in uniform furnace circulation and which appropriately suggests the designation "excess air burner."

Numerous other objects of the invention will suggest themselves and numerous other advantages will become readily apparent as the following description ensues.

In the accompanying two sheets of drawings forming a part of this specification, one illustrative embodiment of an apparatus by means of which the present process may effectively be carried out has been shown.

In these drawings:

FIG. 1 is a perspective view of a burner assembly designed for use in effecting the process of the present invention;

FIG. 2 is a sectional view taken substantially centrally and longitudinally through the burner assembly of FIG. 1;

FIG. 3 is a front elevational view of the burner assembly;

FIG. 4 is a sectional view taken substantially along the line 4—4 of FIG. 2; and FIG. 5 is a sectional view taken substantially along the line 5—5 of FIG. 2.

It is believed that the previously set forth statement of the invention is sufficient for a substantially complete understanding of the improved process so that it remains merely to describe in detail the preferred form of apparatus which has been illustrated in the drawings and by means of which apparatus the process may conveniently be conducted. In FIG. 1, a burner assembly has been designated in its entirety at 10 and the assembly is shown as being operatively applied to a furnace wall made of suitable refractory material 12 that is backed up in the usual manner by a steel plate 14. The furnace wall is provided with a rectangular opening 16 through which the burner nozzle ring structure 18 of the present invention projects. The nozzle ring structure 18 is integrally cast on the front end of a burner body or casing 20. The details of the burner casing 20, including the nozzle ring structure 18 which is integrally formed therewith will be made clear presently, it being deemed sufficient at this time to state that the casing is provided with a forwardly facing annular front wall 22, which extends radially across the front end of a tubular casing wall having a generally cylindrical rear section 24 and an outwardly and forwardly flared generally frusto-conical forward section 26. A pair of laterally extending attachment ears 28 are formed on the frusto-conical section 26 and are adapted to be bolted as at 30 to the back plate 32 of a combustion block assembly 34 including a refractory combustion block proper 36 which is seated within a mounting flange 38 provided on the back plate 32 and which may be cemented or otherwise secured in position on the plate 32. The combustion block 36 is provided with the usual forwardly and outwardly tapering combustion chamber 40 for the products of combustion issuing from the burner. The back plate 32 of the combustion block is adapted to be bolted as at 42 to the furnace wall so that the mounting flange 38 registers with the opening 16.

The casing or housing 20 may be in the form of a casting and it is provided with an internal cylindrical bore 44 in the cylindrical region 24 of the casting and which merges with an internal frusto-conical counterbore 46 in the forward region 26 of the casting. A relatively thin cylindrical separator sleeve 48 has its rear end snugly received within the bore 44 and it extends forwardly across the forward region of the casting and has its forward end or rim seated in a rearwardly facing annular recess 50 provided in the front wall 22. The separator sleeve 48 is adapted to be secured in position within the casing 20 by means of a set screw 52.

From the above description, it will be seen that the separator sleeve 48 divides the forward region 26 of the casing 20 into an outer annular chamber 54 which is designed for the flow of gases therethrough, and an internal chamber 56 designed for the flow of air therethrough. The lower region of the gas chamber 54 is formed with a well portion 58 which communicates through a vertical pipe section 60 with a variable orifice gas valve 62 of conventional construction and having a gas cock 64 associated therewith whereby gas may be admitted to the pipe section 60 and consequently to the chamber 54, in regulable volume.

The cylindrical portion 24 of the casing 20 rearwardly of the sleeve 48 communicates with a pipe section 66 which constitutes one element of a series of piping 68 leading to an air control valve 70 of any suitable design and which has been illustrated herein as being in the form of a gate valve having a gate control handle 72 associated therewith. By adjusting the handle 72, any desired selected flow of air to the burner casing 20 may be attained. It will be understood that usually in carrying out the process of the present invention, the gate valve 72 will be set to a predetermined position and furnace operating characteristics will be altered by manipulation of the gas control valve 64.

Referring now to FIGS. 2 and 3 wherein the details of the burner ring construction 18 are best illustrated, the burner ring 18 constitutes an integral part of the casting front wall 22 and is in the form of an annulus which projects forwardly of the front wall 22 and has a circular central opening 71 of appreciable diameter extending therethrough, the opening being defined by an inwardly directed lip 73 on the annulus. Provided in the front face of the annulus are a series of circumferentially arranged, spaced shallow walls, sockets or depressions 74. While eleven such depressions have been illustrated in the accompanying drawings, it will be understood that a greater or lesser number of such depressions may be provided, if desired; the number of depressions being a function of burner size as well as of desired burner operating characteristics. Extending through the lip 73 and in communication with each of the depressions 74 is an air passage 76, the passage leading from the air chamber 56. The various passages 76 are of a small bore character and they are inclined forwardly and radially outwardly at a small angle in the neighborhood of twelve degrees. Similarly, extending through the lip 73 and establishing communication between the gas chamber 54 and each of the depressions 74 is a gas passage 78, the various gas passages being inclined forwardly and radially inwardly at an angle of approximately twelve degrees. The gas passages present bores which are somewhat larger in diameter than the diameter of the bores associated with the air passages 76. Considering each individual depression 74, it will be seen that the air and gas passages 76 and 78, respectively, are inclined forwardly toward each other and the two passages terminate in respective circular air and gas ports 80 and 82 (FIG. 3) capable of producing tangential jets of air and gas, respectively, which in actual burner operation merge with each other but do not intersect. Because of the fact that the air passages 76 are appreciably narrower than the gas passages 78, the flow of air at any maintained pressure within the air chamber 56 will be greatly restricted and the air issuing from the various air orifices 80 will have insufficient velocity to create, in a strict sense, a definite air jet capable of impingement upon the actual gas jet created by the larger bore gas opening 82. The net result will be that the air which is supplied to each of the depressions 74, or localized combustion regions as they have been termed earlier in the statement of the invention, does not impinge on the gas jet with any appreciable degree of force and it is merely conducted to the depression or localized combustion region to supply the necessary oxygen to the fuel gas for combustion purposes.

The essential and operative elements of the improved burner of the present invention have been described above and certain incidental instrumentalities such as the removable peep sight assembly 81 and pipe plugs 83 are believed to require no detailed description. An integral enlargement 84 (FIG. 1) is provided on the back plate 32 of the combustion block assembly 34 and may be provided with threaded openings 86 and 88 for the reception of an electrode and pilot stem, respectively (not shown).

In the operation of the herein described burner assembly 10, the burner is capable of operation either as a nozzle mixing burner or as an excess air burner as described above. Considering first the operation of the burner as an excess air burner, it is contemplated that air shall be supplied to the chamber 56 through the gate valve 70 at a predetermined pressure and at a fixed velocity as determined by the setting of the gate control handle 72. Assuming for purposes of discussion that the gate valve 72 is maintained in its wide open position, a relatively high velocity of air will obtain at the central large air opening 71 in the burner ring 18. This velocity of air will not vary appreciably during the operation of the burner. A small amount of this air, upon encountering the lip 73, will be forced through the passages 76 and enter the depressions 74 where it is constantly available for combustion-supporting purposes. When the gas control handle 64 associated with the gas valve 62 is adjusted for minimum gas flow through the burner, the small amount of gas passing through the various passages 78 and entering the respective localized regions or depressions 74 in the burner ring 18 will be just sufficient to obtain a localized stoichiometrical gas ratio at these localized regions which will be evidenced by the presence of a small flame of mild intensity within, and projecting forwardly a short distance from, each depression 74. The lip of the opening 71 will completely shield these localized flames from the onrush of air through the opening 71 so that there will be no danger of the flames being "blown out," so to speak, although an injector action will be present tending to draw the completely spent products of combustion caused by the flame into the air stream since the base of the flame in each instance is well within the confines of the depression 74. This injector action will not extend to the base of the depressions and the flame will, therefore, be stable at least at this region. Now, as the gas pressure is turned up by manipulation of the handle 64, excess gas will be supplied to the various depressions 74 through the gas passages 78, while the amount of air flowing through the depressions will remain the same. The excess gas which is not cosumed by combustion due to the less than stoichiometrical air ratio involved will linger in the vicinity of the respective depressions 74 and will be swept by the injector action into the main air stream issuing from the central opening 71. This unburned excess fuel being piloted, so to speak, by the presence of the initial flame within the depression 74, will ignite in the main air stream and flame turbulence and flame intensity within the air stream will be set up on proportion to the quantity of excess fuel gas supplied to the depression 74. At high gas pressures, prior to heating of the combustion block 36, the flame within the air stream may project well beyond the forward end of the combustion block proper 36 and after the combustion block has become fully heated, the flame may settle to a balanced stoichiometrical condition wherein it is substantially confined within the combustion block. Such stoichiometrical conditions in connection with overall burner operation will obtain only when sufficient gas is supplied to the burner to meet the stoichiometrical requirements of the existing air velocity. Anything less than such full gas flow will result in full gas combustion but only partial air combustion so that unburned excess air will pass through the passage 40 of the combustion block 36.

When the burner is thus operated as an excess air burner and the valve 62 is operated to shut down the supply of gas to the burner after a perior of prolonged high heat operation, the extent of combustion within the main air stream issuing from the central opening 71 in the burner ring 18 will be immediately decreased and in the case of minimum gas flow, practically all combustion within the main air stream will be terminated so that nothing but relatively cold air will sweep through the passage 40 and exert a rapid cooling effect on the combustion block 36 and upon the furnace walls or upon any object undergoing treatment within the furnace. The small amount of heat generated by the maintenance of local stoichiometrical flame conditions at each of the individual localized combustion regions or depressions 74 will be negligible, but the maintenance of such flame is important to the proper operation of the present burner system in that such flame maintenance results in ready response of the burner as a whole to any degree of control which may be applied to it by manipulation of the valve control handle 64.

It is obvious that operation of the present burner construction as a nozzle mixing burner will be effected by utilization of the gate valve 70 for control purposes. The two valves 70 and 62 will in such instances be correlated in their operation to attain constant air-gas ratios. Actual expereince has shown that when operating the burner in this manner as a nozzle mixing burner, the turn-down range for reducing the B.t.u. input capacity of the burner is approximately five to one. When operating as an excess air burner, the turn-down range is approximately fifteen to one.

While one specific and preferred form of the apparatus by means of which the present process may be carried out has been described herein, it will be understood that this form of apparatus does not by any means indicate the only form suitable for the process. The form illustrated herein is only one which has been developed for commercial application of the process.

The invention is not to be understood as restricted to the details of either the apparatus or the process set forth since these may be modified within the scope of the appended claim without departing from the spirit and scope of the invention.

Having thus described the invention what we claim as new and desire to secure by Letters Patent is:

That process of combustion which comprises creating a relatively large air jet and a multiplicity of relative small air jets at spaced localized peripheral regions in the vicinity of and surrounding said relatively large jet of air by forcing limited portions of the air from the large jet through restricted air passages leading to the respective localized regions, feeding each of the small jets of air at the respective localized regions with gaseous fuel by creating a companion fuel jet for each of the small air jets at the small region of the latter while simultaneously maintaining a combustion flame in said localized region, and simultaneously varying the quantity of fuel fed to each of the small jets of air by the respective companion fuel jet between such minimum fuel application that said combustion flame is generated under substantially stoichiometric fuel-air ratio so that substantially all of the fuel fed to the small air jets will be consumed in the localized regions and maximum fuel application in an amount sufficient that only a portion of the fuel fed to the small jets of air will be consumed in the localized regions and the excess fuel will be drawn into the large air jet due to its velocity and by an injector action for admixture therewith and that the excess fuel from all of said localized regions drawn into the large stream of air will effect a stoichiometric fuel-air ratio and will burn under the piloting influence of said combustion flame.

References Cited in the file of this patent
UNITED STATES PATENTS

| | | |
|---|---|---|
| 1,342,901 | Good | June 8, 1920 |
| 1,535,491 | Partlow | Apr. 28, 1925 |
| 2,433,610 | Hughey | Dec. 30, 1947 |
| 2,823,740 | Morck | Feb. 18, 1958 |